Jan. 24, 1956 W. VANSELOW ET AL 2,732,304

STABILIZATION OF PHOTOTHERMOGRAPHIC PRINTS

Filed Oct. 15, 1953

WALDEMAR VANSELOW
JOHN A. LEERMAKERS
INVENTORS

BY Daniel I. Mayne
FM Emerson Holmes
ATTORNEYS 2,732,304
Patented Jan. 24, 1956

2,732,304

STABILIZATION OF PHOTOTHERMOGRAPHIC PRINTS

Waldemar Vanselow and John A. Leermakers, Rochester, N. Y., assignors to Eastman Kodak Company, Rochester, N. Y., a corporation of New Jersey Application October 15, 1953, Serial No. 386,359

3 Claims. (Cl. 95—7)

This invention relates to photographic prints such as those described in U. S. Patent 1,976,302 Sheppard and Vanselow which are developed by heat. The preferred forms of photosensitive material include silver oxalate or mercurous oxalate.

The object of the present invention is to provide a photosensitive element of the oxalate type which, after exposure and development, is stable, i. e., does not deteriorate upon subsequent exposure to light. Since the oxalates are primarily sensitive to ultraviolet light, the object of the present invention is to prevent ultraviolet light reaching the sensitive material after it has been developed, but of course the original sensitivity would be reduced if the sensitive layer could not receive ultraviolet light during exposure.

Essentially, the invention consists of providing an overcoat for the sensitive layer, which overcoat is relatively transparent to ultraviolet light until it is heat treated during the development of the image, after which the coating becomes an ultraviolet absorber. The overcoating, according to the invention, contains one or more of the following compounds: Polyvinyl butyral, polyvinyl alcohol, sugars, salicylaldehyde, piperonal acetophenone, benzoylacetone, diacetyl, and ethylene glycol monoethyl ether. Of these the most preferred ones are the hydroxyl compounds including the sugars, polyvinyl alcohol, and particularly polyvinyl butyral which gives the highest degree of stabilization of all of those mentioned.

Figure 1:
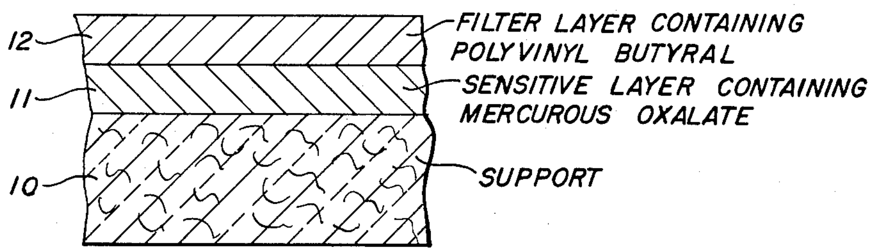
Figure 2:
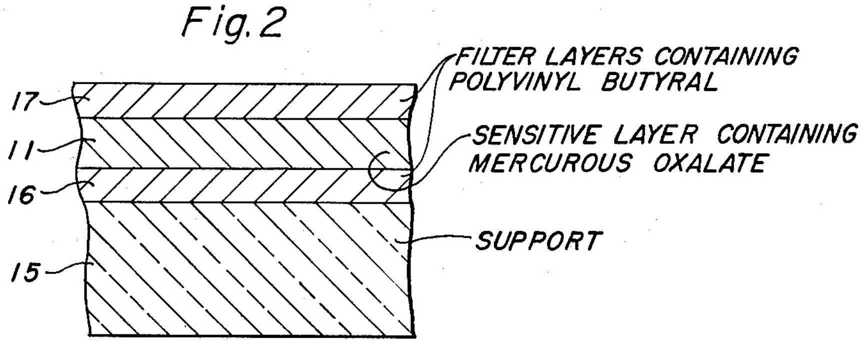
Figure 3:
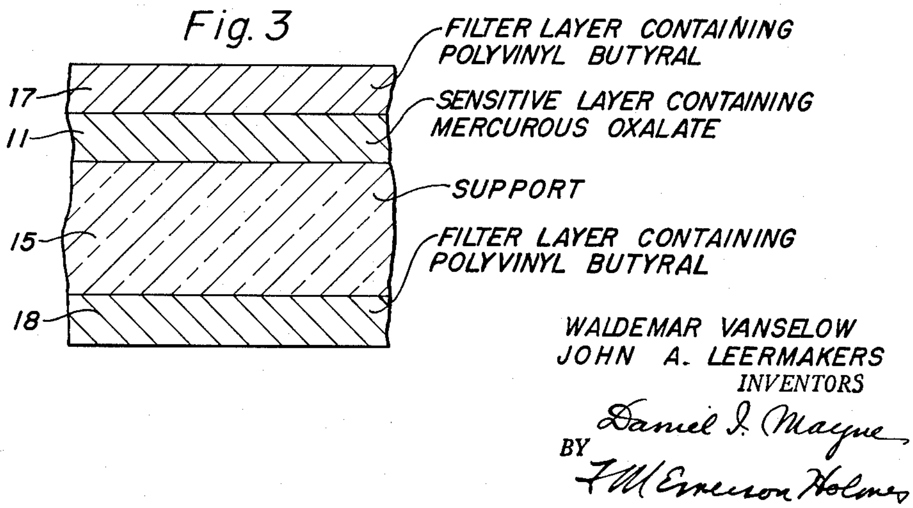

The invention is illustrated in the accompanying drawing in which Figs. 1, 2 and 3 are greatly enlarged cross-sections of photosensitive elements incorporating the invention.

In Fig. 1 a support 10 such as film or paper carries a colloid layer in which the primary sensitive material is silver oxalate or mercurous oxalate. According to the invention, an overcoating 12 is provided which contains polyvinyl butyral or one of the other compounds mentioned above. Upon exposure to ultraviolet light, an image is formed in the layer 11 since the ultraviolet light passes easily through the upper layer 12. This image is developed thermographically and at the same time the layer 12 turns yellowish and becomes an absorber for ultraviolet light which thus stabilizes the image formed in the layer 11.

In Fig. 2 the support 15 is transparent to ultraviolet light and hence the sensitive layer 11 is provided with a subbing 16 and an overcoating 17 both containing polyvinyl butyral or one of the other compounds mentioned. Similarly in Fig. 3, the photosensitive layer 11 is protected from the front by an overcoating 17 and is protected from the rear by a coating 18 on the back of the support 15.

Of course, the overcoating could be placed on the image layer after development, for example by lamination and in this case any simple yellow filter could be used. However, such an arrangement is neither convenient nor inexpensive. Alternatively, one of the above compounds or any ultraviolet absorber could be applied by dipping the exposed film or paper in hot paraffin or hot ceresin wax containing the compound, the heat of the wax providing the development of the print.

As an example of Fig. 1, a mercurous oxalate colloid layer 11 is overcoated with a layer 12, 0.2 mm. thick, of polyvinyl butyral containing triethylene glycol-di-2-ethyl butyrate as plasticizer. The layer 12 transmits ultraviolet out to 286 millimicrons wavelength. After the layer 11 is exposed to an image and developed for 6 minutes at a temperature of 145° C., the layer 12 becomes a U. V. absorber and transmits only out to 358 millimicrons.

As examples of suitable sugars, we use dextro or laevo arabinose, dextro galactose, dextro lyxose, laevo rhamnose, or laevo xylose. For example, two grams of laevo xylose in 5 cc. of water are added to 100 cc. of 7% gelatin at a pH of 4.0. The layer 12 is then coated with about 1 cc. of this gelatin solution to 10 square centimeters of surface thus providing about 1 or 2 milligrams of laevo xylose per square centimeter.

We claim:

1. A stabilized heat developable photosensitive element comprising a support, a sensitive colloid layer thereon including as its primary photosensitive constituent a metal oxalate selected from the group consisting of silver oxalate and mercurous oxalate and a protective overcoating on the colloid containing polyvinyl butyral.

2. A stabilized heat developable photosensitive element comprising a support, a sensitive colloid layer thereon including as its primary photosensitive constituent a metal oxalate selected from the group consisting of silver oxalate and mercurous oxalate and a protective overcoating on the colloid containing a compound selected from the group consisting of polyvinyl butyral, polyvinyl alcohol, sugars, salicylaldehyde, piperonal acetophenone, benzoylacetone, diacetyl, and ethylene glycol monoethyl ether.

3. A stabilized heat developable photosensitive element comprising a support, a sensitive colloid layer thereon including as its primary photosensitive constituent a metal oxalate selected from the group consisting of silver oxalate and mercurous oxalate and a protective overcoating on the colloid containing a hydroxyl compound selected from the group consisting of polyvinyl butyral, polyvinyl alcohol and sugars.

References Cited in the file of this patent

UNITED STATES PATENTS

| | | |
|---|---|---|
| 1,844,199 | Bicknell et al. | Feb. 9, 1932 |
| 1,976,302 | Sheppard et al. | Oct. 9, 1934 |
| 2,095,839 | Sheppard et al. | Oct. 12, 1937 |
| 2,245,218 | Murray et al. | June 10, 1941 |